US008412376B2

(12) United States Patent
Abdallah et al.

(10) Patent No.: US 8,412,376 B2
(45) Date of Patent: Apr. 2, 2013

(54) TENSION DISTRIBUTION IN A TENDON-DRIVEN ROBOTIC FINGER

(75) Inventors: Muhammad E. Abdallah, Houston, TX (US); Robert Platt, Cambridge, MA (US); Charles W. Wampler, II, Birmingham, MI (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 410 days.

(21) Appl. No.: 12/720,725

(22) Filed: Mar. 10, 2010

(65) Prior Publication Data

US 2010/0280659 A1 Nov. 4, 2010

Related U.S. Application Data

(60) Provisional application No. 61/174,316, filed on Apr. 30, 2009.

(51) Int. Cl.
*G06F 19/00* (2006.01)
*B25J 15/08* (2006.01)

(52) U.S. Cl. ............ 700/245; 700/250; 700/260; 901/2; 901/11; 901/14; 901/19; 901/21; 901/29; 901/32; 901/39

(58) Field of Classification Search .................. 700/250, 700/260, 245; 901/32, 39, 2, 11, 14, 29, 901/1, 50; 463/31; 715/727, 701, 849; 318/611, 318/632, 568.21, 568.24, 606, 615, 625, 318/626

See application file for complete search history.

(56) References Cited

U.S. PATENT DOCUMENTS

| | | | | |
|---|---|---|---|---|
| 4,860,215 | A * | 8/1989 | Seraji | 700/260 |
| 5,910,720 | A * | 6/1999 | Williamson et al. | 318/623 |
| 6,435,794 | B1 * | 8/2002 | Springer | 414/5 |
| 7,341,295 | B1 * | 3/2008 | Veatch et al. | 294/106 |
| 7,699,835 | B2 * | 4/2010 | Lee et al. | 606/1 |
| 7,747,311 | B2 * | 6/2010 | Quaid, III | 600/424 |
| 8,060,250 | B2 * | 11/2011 | Reiland et al. | 700/245 |
| 2009/0249903 | A1 * | 10/2009 | Godler | 74/89.2 |
| 2010/0261526 | A1 * | 10/2010 | Anderson et al. | 463/31 |

OTHER PUBLICATIONS

Lee et al., Torque Resolver Design for Tendon-Driven Manipulators, Technical Research Report TR 91-52, University of Maryland (1991).

J. Salisbury et al., Articulated hands: Force Control and Kinematic Issues, The International Journal of Robotics Research, vol. 1, No. 1, pp. 4-17 (1992).

Jacobsen et al., The UTAH/M.I.T. Dextrous Hand: Work in Progress, The International Journal of Robotics Research, vol. 3, No. 4 (Winter 1984).

S. Hirose et al., Coupled Tendon-driven Multijoint Manipulator, Proceedings of 1991 IEEE International Conference on Robotics and Automation, Sacramento, CA (Apr. 1991).

* cited by examiner

*Primary Examiner* — Ronnie Mancho

(74) *Attorney, Agent, or Firm* — Quinn Law Group, PLLC

(57) ABSTRACT

A method is provided for distributing tension among tendons of a tendon-driven finger in a robotic system, wherein the finger characterized by n degrees of freedom and n+1 tendons. The method includes determining a maximum functional tension and a minimum functional tension of each tendon of the finger, and then using a controller to distribute tension among the tendons, such that each tendon is assigned a tension value less than the maximum functional tension and greater than or equal to the minimum functional tension. The method satisfies the minimum functional tension while minimizing the internal tension in the robotic system, and satisfies the maximum functional tension without introducing a coupled disturbance to the joint torques. A robotic system includes a robot having at least one tendon-driven finger characterized by n degrees of freedom and n+1 tendons, and a controller having an algorithm for controlling the tendons as set forth above.

15 Claims, 2 Drawing Sheets

TENSION DISTRIBUTION IN A TENDON-DRIVEN ROBOTIC FINGER

CROSS-REFERENCE TO RELATED APPLICATIONS

The present application claims the benefit of and priority to U.S. Provisional Application No. 61/174,316 filed on Apr. 30, 2009.

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to tension distribution in the torque control of a tendon-driven manipulator.

BACKGROUND OF THE INVENTION

Robots are automated devices able to manipulate objects using a series of links, which in turn are interconnected via one or more robotic joints. Each joint in a typical robot represents at least one independent control variable, i.e., a degree of freedom (DOF). End-effectors such as hands, fingers, or thumbs are ultimately actuated to perform a task at hand, e.g., grasping a work tool or an object. Therefore, precise motion control of the robot may be organized by the level of task specification, including object, end-effector and joint-level control. Collectively, the various control levels achieve the required robotic mobility, dexterity, and work task-related functionality.

Tendon transmission systems are often used in robotic systems, e.g., in the actuation of robotic fingers in high degree of freedom (DOF) hands. For force control of a given tendon-driven finger, the desired torques on the finger must be translated into tension on the tendons. Since tendons can only transmit forces in tension, i.e., in a pull-pull arrangement, the number of tendons and the number of actuators must exceed the DOF to achieve fully determined control of the tendon-driven finger. To become fully determined, the finger needs only one tendon more than the number of DOF, which is known as an n+1 arrangement.

Given a desired set of joint torques, an infinite set of solutions exist for corresponding tendon tensions. Any solution, however, that assigns a negative tension value to a tendon is not physically valid. This is due to the unidirectional nature of the tendons, i.e., tendons can resist extension but not compression. Existing methods for this problem provide solutions that ensure that all tendon tensions are greater than or equal to zero. However, when upper saturation limits are achieved, e.g., when the maximum tension limit of the hardware is met, the resulting joint torques may become unpredictable, and undesired coupling may be introduced.

SUMMARY OF THE INVENTION

Accordingly, a torque control method and system are provided herein for tension distribution in a robotic manipulator driven by tendons. The method assigns or distributes tension to each tendon of the manipulator within a lower and upper bound. It satisfies the lower bound while minimizing the internal tension applied. At the same time, it satisfies the upper bound while eliminating the coupled effects of saturation. Smooth and predictable torque control of the manipulator is thus provided.

The method distributes tension among n+1 tendons of a tendon-driven finger in a robotic system, wherein the finger itself is characterized by n degrees of freedom. The method includes determining a maximum and a minimum functional tension of each of the n+1 tendons, and using a controller to automatically distribute tension among the n+1 tendons. Each tendon is assigned a tension value that is less than its corresponding maximum functional tension and greater than or equal to its corresponding minimum functional tension.

When the upper bound is exceeded by a tendon, the method provides for a linear scaling of the joint torques such that the upper bound is satisfied. This linear scaling allows the tensions to saturate without coupling effects across the joint torques. The method always assigns the minimum tension value equal to the lower bound. This ensures that the internal tension on the structure is minimized. The method is shown to require a maximum of one iteration of the solution. Hence, it does not entail an open-ended iterative process, as the mathematical nature of the problem would otherwise entail. This characteristic is important for real-time applications.

A robotic system includes a robot having at least one tendon-driven finger characterized by n degrees of freedom and n+1 tendons, and a controller having an algorithm for controlling the n+1 tendons. The algorithm is adapted for determining a maximum and a minimum functional tension of each of the n+1 tendons, and automatically distributing tension among the n+1 tendons, such that each tendon is assigned a tension value that is less than its corresponding maximum functional tension and greater than or equal to its corresponding minimum functional tension.

A controller is also provided for the tendon-driven robotic finger, with the controller including an algorithm adapted for determining a maximum and a minimum functional tension of each tendon of the tendon-driven finger, and automatically distributing tension among the n+1 tendons as noted above.

The above features and other features and advantages of the present invention are readily apparent from the following detailed description of the best modes for carrying out the invention when taken in connection with the accompanying drawings.

DESCRIPTION OF THE PREFERRED EMBODIMENT

Figure 1:
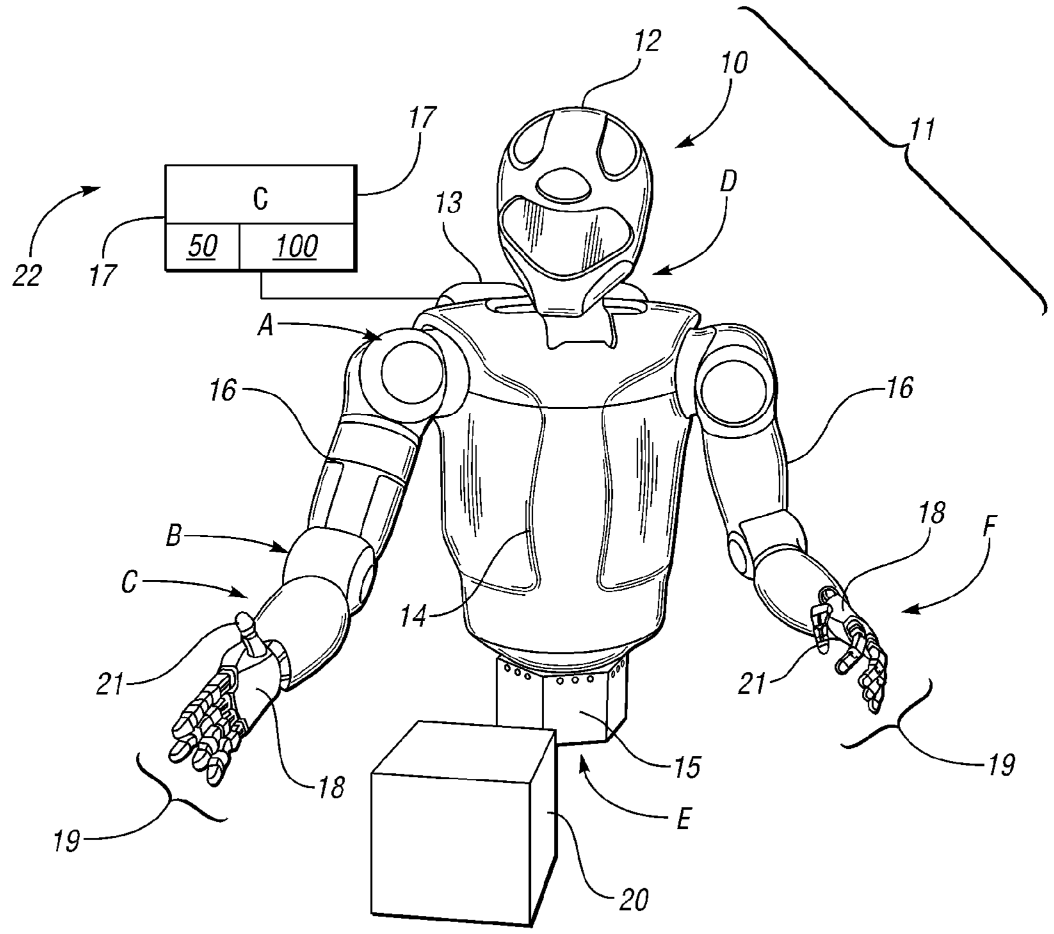
FIG. 1 is a schematic illustration of a robotic system in accordance with the invention.

Referring to the drawings, wherein like reference numbers refer to the same or similar components throughout the several views, and beginning with FIG. 1, a robotic system 11 is shown having a robot 10, e.g., a dexterous humanoid-type robot as shown or any part thereof, that is controlled via a control system or controller (C) 22. The controller 22 includes an algorithm 100 for controlling one or more tendon-driven fingers 19, as explained below. Controller 22 is electrically connected to the robot 10, and is adapted for controlling the various manipulators of the robot 10, including one or more tendon-driven fingers 19 as described in detail below with reference to FIGS. 2 and 3.

The robot 10 is adapted to perform one or more automated tasks with multiple degrees of freedom (DOF), and to perform other interactive tasks or control other integrated system components, e.g., clamping, lighting, relays, etc. According to one embodiment, the robot 10 is configured as a humanoid robot as shown, with over 42 DOF, although other robot designs may also be used having fewer DOF, and/or having only a hand 18 with at least one tendon-driven finger 19, without departing from the intended scope of the invention. The robot 10 of FIG. 1 has a plurality of independently and interdependently-moveable manipulators, e.g., the hands 18, fingers 19, thumbs 21, etc., including various robotic joints. The joints may include, but are not necessarily limited to, a shoulder joint, the position of which is generally indicated by arrow A, an elbow joint (arrow B), a wrist joint (arrow C), a neck joint (arrow D), and a waist joint (arrow E), as well as the finger joints (arrow F) between the phalanges of each robotic finger.

Each robotic joint may have one or more DOF, which varies depending on task complexity. Each robotic joint may contain and may be internally driven by one or more actuators, e.g., joint motors, linear actuators, rotary actuators, and the like. The robot 10 may include human-like components such as a head 12, a torso 14, a waist 15, and arms 16, as well as the hands 18, fingers 19, and thumbs 21, with the various joints noted above being disposed within or between these components. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, or which may be attached remotely through a tethering cable, to provide sufficient electrical energy to the various joints for movement of the same.

Still referring to FIG. 1, the controller 22 may include multiple digital computers or data processing devices each having one or more microprocessors or central processing units (CPU), read only memory (ROM), random access memory (RAM), erasable electrically-programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 22 or readily accessible thereby may be stored in ROM and automatically executed at one or more different control levels to provide the respective control functionality.

The controller 22 may include a server or a host machine 17 configured as a distributed or a central control module, and having such control modules and capabilities as might be necessary to execute all required control functionality of the robot 10 in the desired manner. Additionally, the controller 22 may be configured as a general purpose digital computer generally comprising a microprocessor or central processing unit, read only memory (ROM), random access memory (RAM), electrically-erasable programmable read only memory (EEPROM), a high speed clock, analog-to-digital (A/D) and digital-to-analog (D/A) circuitry, and input/output circuitry and devices (I/O), as well as appropriate signal conditioning and buffer circuitry. Any algorithms resident in the controller 22 or accessible thereby, including an algorithm 100 for distributing tension among tendons of a manipulator as explained below, e.g., a finger 19, and a tendon map 50 as explained below, which may be stored in ROM and accessed or executed as needed to provide the respective functionality.

Figure 2:
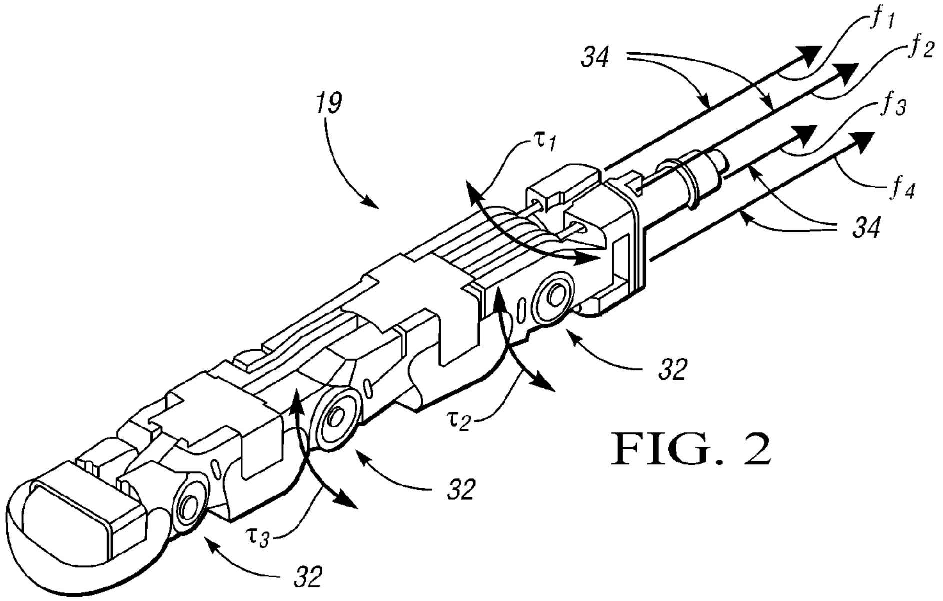
FIG. 2 is an illustration of a tendon-driven finger in accordance with the present invention.

Referring to FIG. 2, a tendon-driven finger 19 may be used with the robot 10 of FIG. 1, or with any other robot requiring application of a grasping force to an object. In the torque control of tendon-driven fingers, the desired joint torques must first be translated into tendon tensions. This problem is referred to as tension distribution, and it must ensure that each tension value is non-negative. The present invention ensures that each tension falls within a bounded range $[f_{min}, f_{max}]$, where $f_{min} \geqq 0$. It sets the lowest tension value equal to $f_{min}$ and thus minimizes the internal tension. Whenever the highest tension value exceeds $f_{max}$, it solves for the linear scaling of the torques needed to satisfy the bounds while minimizing the internal tension.

Finger 19 includes tendons 34 and a plurality of joints 32, some of which are independent joints indicated by arrows $\tau_1$, $\tau_2$, and $\tau_3$. Finger 19 has n independent joints (n DOF) and n+1 tendons 34. The finger 19 shown in FIG. 2 has 3 DOF, therefore the number of tendons=4 in this particular embodiment, although more or fewer tendons and/or DOF may also be used without departing from the intended inventive scope. Note that the distal joint is mechanically coupled to the adjacent joint, i.e., the medial joint; hence, the distal joint is not an independent DOF. Also, control of the finger 19 is fully determined, as that term is understood in the art, and therefore the number of tendons 34 is n+1, or 4 in the particular embodiment shown in FIG. 2. As noted above, each independent joint 32 is characterized by a joint torque r. Each of the n tendons 34 is characterized by a tension f, represented in FIG. 2 as $f_1$, $f_2$, $f_3$ and $f_4$ or generally, as $f_1$ through $f_{n+1}$.

For a tendon-driven finger 19 having n degrees of freedom and n+1 tendons 34, the torque control strategy is determined by algorithm 100, which automatically distributes tension among the n+1 tendons such that each respective tendon is assigned a respective tension $f_1$ through $f_{n+1}$ that is less than the maximum functional tension, $f_{max}$, and greater than or equal to the minimum functional tension, $f_{min}$. The tensions f through $f_{n+1}$ are allocated within the range, $[f_{min}, f_{max}]$, by linearly scaling the joint torques when necessary.

Therefore, in tendon-driven finger 19, the vector of tendon tensions, f is allocated such that each tension $f_1$ through $f_{n+1}$ falls within the range $[f_{min}, f_{max}]$. Due to the unidirectional nature of the tendons 34, $f_{min} \geqq 0$. The relationship between the n joint torques, $\tau$, and the n+1 tendon tensions $f_1$ through $f_{n+1}$ is:

$$\begin{pmatrix} \tau \\ t \end{pmatrix} = \begin{bmatrix} R \\ w \end{bmatrix} f \tag{1}$$

where t is defined as the internal tension. R ($\in \Re^{n \times n+1}$) is the tendon map 50, shown schematically in FIG. 1, containing the joint radii data mapping tendon tensions f to joint torques $\tau$. w is an n+1 row matrix that does not lie in the range space of R. Notably, for the system to be tendon-controllable, the tendon map (R) 50 must have an all-positive null-space. The "internal tension" is thus a weighted sum of all the tensions; hence, a smaller internal tension indicates smaller tensions amongst the tendons and a smaller net force on the structure.

The inverse of the tendon transformation in (1) can be partitioned as follows:

$$f = \begin{bmatrix} R \\ w \end{bmatrix}^{-1} \begin{pmatrix} \tau \\ t \end{pmatrix} = [A \quad a] \begin{pmatrix} \tau \\ t \end{pmatrix} \tag{2}$$

A ($\in \Re^{n+1\times n}$) and $\alpha$ ($\in \Re^{n+1\times 1}$) are constants that can be computed ahead of time and stored as calibrated values, and w is selected to be orthogonal to R($Rw^T=0$). Under this condition:

$$A=R^+, \alpha=w^+. \tag{3}$$

The superscript ($^+$) indicates the pseudoinverse. As noted, the null-space of the tendon transform must be a positive vector. $\alpha$ is thus also all-positive, since the pseudoinverse of a positive vector is also positive.

Figure 3:
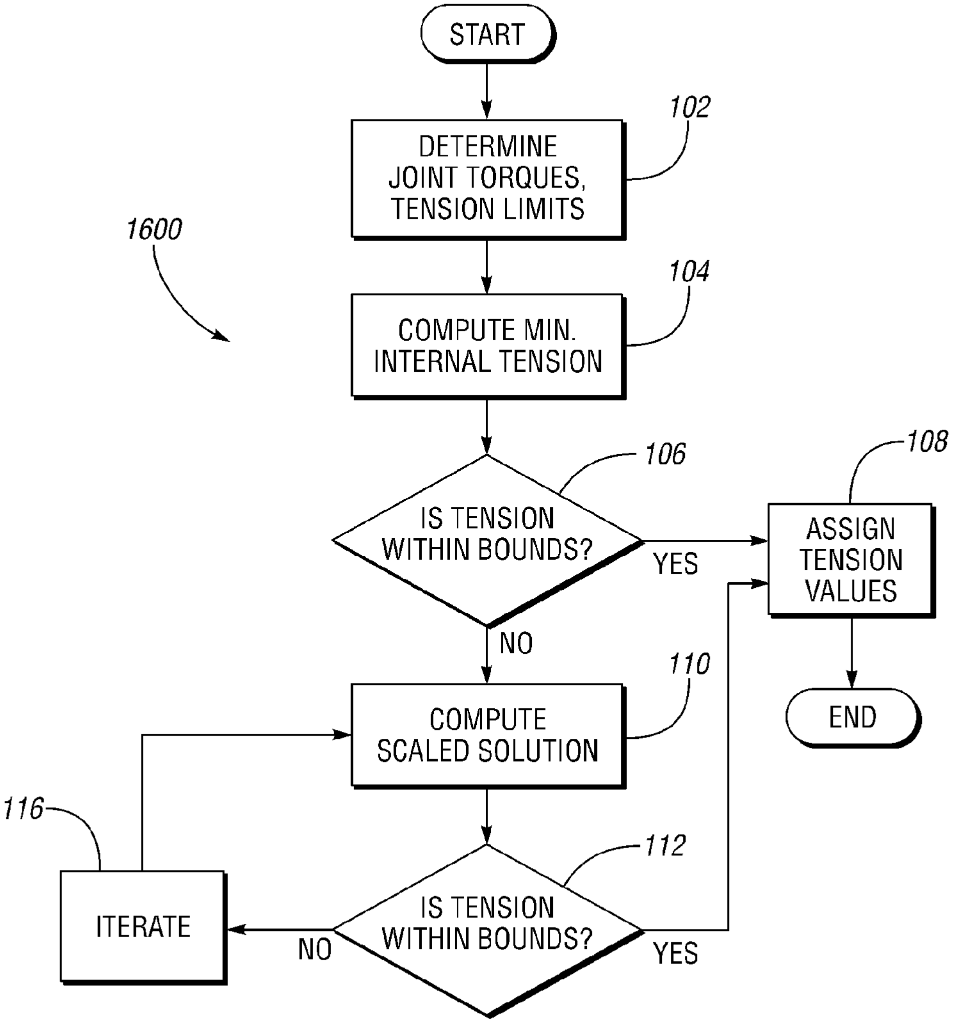
FIG. 3 is a flowchart describing an algorithm that distributes the tension assigned to each tendon in accordance with the present invention.

Referring to FIG. 3, algorithm 100 may be executed by the controller 22 of FIG. 1 to provide the control strategy of the present invention. Algorithm 100 begins at step 102, wherein the joint torques and tension limits of finger 19 are determined, and provided to as a set of inputs to algorithm 100. Once provided, the algorithm proceeds to step 104, and the controller 22 calculates the minimum internal tension of the finger 19. Step 104 requires the distribution of tensions $f_1$, through $f_{n+1}$ so that the minimum value equals $f_{min}$. In equation (4) below, A, represents the $i^{th}$ row of A and $\alpha_i$, the $i^{th}$ row of $\alpha$, where $\alpha_i$ are all positive elements:

$$f_i=A_i\tau+\alpha_i t \geqq f_{min} \tag{4}$$

This provides the following solution for the internal tension, $t_0$:

$$t_0 \max_i \frac{f_{min} - A_i\tau}{a_i} \tag{5}$$

Proceeding to step 106, the internal tension value $t_0$ is then substituted into equation (2) for the tension distribution, i.e.,:

$$f = [A \quad a] \begin{pmatrix} \tau \\ t_0 \end{pmatrix} \tag{6}$$

Thereafter, the controller 22 determines whether any of the tension values $f_1$ through $f_{n+1}$ exceeds the upper bound, $f_{max}$. If none of the tension values $f_1$ through $f_{n+1}$ exceeds the upper bound, $A_{max}$, the algorithm 100 proceeds to step 108, the tension values $f_1$ through $f_{max}$, are assigned to their respective tendons 34, and the algorithm 100 is finished. If at step 106 it is determined that any of the tension values $f_1$ through $f_{n+1}$ exceeds the upper bound, $f_{max}$, the algorithm proceeds to step 110, wherein a scaled solution is computed. Let i represent the element with the minimum tension and j represent the element with the maximum tension. Assuming that $f_j>f_{max}$ the torques are linearly scaled:

$$f = [A \quad a] \begin{pmatrix} \alpha\tau \\ t \end{pmatrix} \tag{7}$$

and the solution is found where $f_i=f_{min}$ and $f_j=f_{max}$. $\alpha$ is a positive scalar. The exact solution follows:

$$d = (a_j A_i - a_i A_j)\tau \qquad \alpha = \frac{a_j f_{min} - a_i f_{max}}{d} \qquad t = \frac{f_{max}A_i - f_{min}A_j}{d}\tau \tag{8}$$

This solution guarantees that $f\in[f_{min}, f_{max}]$under two conditions: when $f_{min}=0$ or the finger 19 has a balanced configuration. A finger with a balanced configuration exhibits no net torques when the tensions are all equal (so the elements of w are all equal). In one of these two cases, the algorithm can immediately move to step 108 and exit. Otherwise, the solution does not guarantee that all elements lie within the desired limits, and the results need to be checked with the possibility of a second iteration. If none of the tension values $f_1$ through $f_{n+1}$ exceeds the upper bound, $f_{max}$, then, at step 116 the tension values $f_1$ through $f_{n+1}$ are assigned to their respective tendons 34.

If at step 112 any of the tension values $f_1$ through $f_{n+1}$ exceeds the upper bound, $f_{max}$, then, at step 116, equation (8) above is iterated after reassigning the index i or j, respectively, to the new extreme element. Due to the nature of the tendon transformation, the need to iterate should occur only rarely. For a typical design, for example, it may occur for less than 2% of the commanded torque values. In addition, a second iteration is effectively sufficient for fully determining the tension values to be assigned, and the algorithm can be capped at that iteration.

Advantages of the present invention lie in at least two key points. First, the distribution of tendon tensions occurs with a computationally-efficient algorithm, i.e., algorithm 100, that does not required linear programming. Second, the maximum tension is capped or limited with a linear scaling of the desired joint torques, eliminating the coupling and coupled disturbance ordinarily caused by saturation, producing smooth and linear torque control. This is in contrast to conventional methods which have tensions saturating mechanically to produce coupled and unpredictable torques. Additionally, algorithm 100 sets the lowest tension equal to the lower bound, or limit, thus minimizing the internal tension.

The scaled solution resultant from equation (8) rarely pushes another element beyond the bounds, that is, beyond $f_{max}$. This result can also be explained analytically, based on the nature of R. First, note that $\alpha$ is scalar such that $\alpha\in(0,1)$. The result is intuitive, and the proof follows. Consider the solution for $\alpha$ in (8). Since $f_i=f_{min}$ and $f_j>f_{max}$:

$$f_{min}=A_i\tau+\alpha_i t_0$$

$$f_{max}<A_j\tau+\alpha_j t_0 \tag{9}$$

Substituting into equation (8) shows that $\alpha<1$. At the same time, showing that $\alpha>0$ is trivial.

Let the parameters ($^0f$, $t_0$) refer to the initial solution (6), while ($^1f$, $t_1$) refer to the first iteration of the scaled solution to equation (8). It can be shown that the two solutions relate as follows. Recall that i and j refer to the elements with the lowest and highest values, respectively.

$${}^1f = \alpha^0 f + \frac{(1-\alpha)f_{min}}{a_i}a \tag{10}$$

The first term on the right-hand side is the linearly scaled portion of the result. This term maintains the order of the elements. The second term, however, represents deviation from the linear distribution. Hence, when $f_{min}=0$, the term drops out and the scaled solution fully maintains the relative magnitudes of the elements. This guarantees that $f\in[0, f_{max}]$.

When $f_{min}\neq 0$, the relative order of the elements can change and a different element can jump the limit. Consider the case when another element, k, exceeds element j such that $^1f_k > {}^1f_j$. As seen from equation (10), the difference after the first iteration is:

$$^1f_k - {}^1f_j = \alpha({}^0f_k - {}^0f_j) + (1-\alpha)f_{min}\left(\frac{a_k}{a_i} - \frac{a_j}{a_i}\right) > 0 \quad (11)$$

The first term is less then zero by the definition of element j. Regarding the second term, the elements of α are equal given a balanced configuration. Hence, $^1f_k$ can never be greater than $^1f_j$ in this case. This occurs whenever the columns of R sum to zero. Typically, fingers 19, if not balanced, will not diverge greatly from a balanced configuration. Accordingly, the relative difference between the elements of α will be small, and as such, α third element will rarely exceed the desired limits after the first iteration in equation (8). Hence, step 116 needs to be performed only once.

While the best modes for carrying out the invention have been described in detail, those familiar with the art to which this invention relates will recognize various alternative designs and embodiments for practicing the invention within the scope of the appended claims.

The invention claimed is:

1. A method for distributing tension among n+1 tendons of a tendon-driven finger in a robotic system, the finger being characterized by n degrees of freedom, the method comprising:

determining a maximum functional tension and a minimum functional tension; and using a controller to automatically distribute tension among the n+1 tendons using a tendon map containing moment arm data mapping tendon tensions to joint torques within the tendon-driven finger, such that each tendon is assigned a tension value that is less than the maximum functional tension and greater than or equal to the minimum functional tension.

2. The method of claim 1, wherein using a controller to automatically distribute tension includes: calculating, using the controller, a linear scaling of joint torques of each of a plurality of joints of the tendon-driven finger in order to find a scaled solution.

3. The method of claim 2, further comprising:

iterating the scaled solution if any of the tension values of a given tendon exceeds the corresponding maximum functional tension for that tendon.

4. The method of claim 1, wherein n=3.

5. The method of claim 1, wherein the minimum functional tension is greater than zero, and wherein internal tension of the tendon-driven finger is minimized by ensuring that a lowest assigned tension value equals the minimum functional tension.

6. The method of claim 1, wherein the maximum functional tension is satisfied without introducing a coupled disturbance to joint torques of each of a plurality of joints of the tendon-driven finger.

7. A robotic system comprising:

a robot having at least one tendon-driven finger characterized by n degrees of freedom and n+1 tendons; and a controller having an algorithm for controlling the n+1 tendons;

wherein the algorithm is adapted for:

determining a maximum functional tension and a minimum functional tension of the tendon-driven finger; and automatically distributing tension among the n+1 tendons, such that each tendon is assigned a tension value that is less than the maximum functional tension and greater than or equal to the minimum functional tension; and wherein the controller includes a tendon map containing moment arm data mapping tendon tensions to joint torques within the tendon-driven finger, and wherein the algorithm is further adapted to automatically distribute tension using the tendon map.

8. The robotic system of claim 7, wherein the robot is a humanoid robot having at least 42 degrees of freedom.

9. The robotic system of claim 7, wherein the algorithm is adapted to automatically distribute tension by: calculating a linear scaling of joint torques of each of a plurality of joints of the tendon-driven finger in order to find a scaled solution.

10. The robotic system of claim 9, further comprising: iterating the scaled solution if any of the tension values of a given tendon exceeds the corresponding maximum functional tension for that tendon.

11. The robotic system of claim 7, wherein n=3.

12. A controller for a tendon-driven robotic finger having n degrees of freedom, the tendon-driven finger comprising n+1 tendons, wherein the controller includes an algorithm adapted for:

determining a maximum functional tension and a minimum functional tension of the tendon-driven finger; and automatically distributing tension among the n+1 tendons, such that each tendon is assigned a tension value that is less than the maximum functional tension and greater than or equal to the minimum functional tensions;

wherein the controller includes a tendon map containing moment arm data mapping tendon tensions to joint torques within the tendon-driven finger; and wherein the algorithm is further adapted to automatically distribute tension using the tendon map.

13. The controller of claim 12, wherein the algorithm is adapted to automatically distribute tension by: calculating a linear scaling of joint torques of each of a plurality of joints of the tendon-driven finger to find a scaled solution.

14. The controller of claim 13, further comprising: iterating the scaled solution if the tension value exceeds the maximum functional tension.

15. The robotic system of claim 12, wherein n=3.

* * * * *